(12) United States Patent
Blech et al.

(10) Patent No.: US 9,203,160 B2
(45) Date of Patent: Dec. 1, 2015

(54) ANTENNA ARRANGEMENT AND BEAM FORMING DEVICE

(71) Applicant: Sony Corporation, Tokyo (JP)

(72) Inventors: Marcel Blech, Herrenberg (DE); Richard Stirling-Gallacher, Dallas, TX (US); Furkan Dayi, Stuttgart (DE)

(73) Assignee: Sony Corporation, Tokyo (JP)

( * ) Notice: Subject to any disclaimer, the term of this patent is extended or adjusted under 35 U.S.C. 154(b) by 591 days.

(21) Appl. No.: 13/708,138

(22) Filed: Dec. 7, 2012

(65) Prior Publication Data

US 2013/0162475 A1 Jun. 27, 2013

(30) Foreign Application Priority Data

Dec. 21, 2011 (EP) .................................. 11194810

(51) Int. Cl.
*H01Q 3/00* (2006.01)
*H01Q 21/08* (2006.01)
*H01Q 21/06* (2006.01)
*H01Q 21/28* (2006.01)

(52) U.S. Cl.
CPC ............. *H01Q 21/08* (2013.01); *H01Q 21/061* (2013.01); *H01Q 21/28* (2013.01)

(58) Field of Classification Search
CPC ...... H01Q 21/08; H01Q 21/061; H01Q 21/28
USPC ........................................................ 342/368
See application file for complete search history.

(56) References Cited

U.S. PATENT DOCUMENTS

| | | | |
|---|---|---|---|
| 7,994,965 B2 | 8/2011 | Longstaff | |
| 2005/0101352 A1* | 5/2005 | Logothetis | H01Q 1/246 455/562.1 |
| 2007/0035463 A1* | 2/2007 | Hirabayashi | H01Q 21/24 343/824 |

OTHER PUBLICATIONS

B. Yang et al., "Experimental Verification of 2D UWB MIMO Antenna Array for Near-field Imaging Radar", Proceedings of the 39th European Microwave Conference, Sep. 29-Oct. 1, 2009, Rome, Italy, http://ieeexplore.ieee.org/xpl/freeabs_all.jsp?arnumber=5295977, pp. 97-100.

Joachim H. G. Ender et al., "System architectures and algorithms for radar imaging by MIMO-SAR", IEEE Radar Conference 2009, pp. 1-6.

Jens Klare et al., "First Experimental Results with the Imaging MIMO Radar MIRA-CLE X", EUSAR Conference 2010, pp. 374-377.

(Continued)

*Primary Examiner* — Frank J McGue
(74) *Attorney, Agent, or Firm* — Oblon, McClelland, Maier & Neustadt, L.L.P.

(57) ABSTRACT

An antenna arrangement comprises a first antenna array comprising a systematic arrangement of first antennas, at least two second antenna arrays, arranged adjacent to said first antenna array and each comprising a systematic arrangement of second antennas, at least two third antenna arrays each comprising at least one third antenna, wherein a third antenna array is arranged at a border area of said first antenna array and a second antenna array and replaces a first antenna closest to the adjacent second antenna array and a second antenna closest to the adjacent first antenna array. Said first or second antennas are transmitting and the other of said first or second antennas are receiving radiation. The at least one third antenna is transmitting and/or receiving radiation.

24 Claims, 9 Drawing Sheets

(56) References Cited

OTHER PUBLICATIONS

Sherif Sayed Ahmed et al., "Near Field mm-Wave Imaging with Multistatic Sparse 2D-Arrays", Proceedings of the 6$^{th}$ European Radar Conference, Sep. 30-Oct. 1, 2009, Rome, Italy, pp. 180-183.

Xiaodong Zhuge, "Short-Range Ultra-Wideband Imaging with Multiple-Input Multiple-Output Arrays", PhD Thesis, Delft University of Technology, 2010, pp. 1-217.

Viktor Krozer et al., "Terahertz Imaging Systems With Aperture Synthesis Techniques", IEEE Transactions on Microwave Theory and Techniques, vol. 58, No. 7, Jul. 2010, pp. 2027-2039.

* cited by examiner

ANTENNA ARRANGEMENT AND BEAM FORMING DEVICE

CROSS-REFERENCE TO RELATED APPLICATION

The present application claims the benefit of the earlier filing date of EP 11194810.5 filed in the European Patent Office on Dec. 21, 2011 the entire content of which application is incorporated herein by reference.

BACKGROUND

1. Field of the Disclosure

The present invention relates to an antenna arrangement and to a beam forming device, e.g. for use in an active imaging device for imaging a scene.

2. Description of Related Art

Active imaging systems are becoming more and more popular at ultra-sonic, microwave, millimeter and terahertz frequencies for a number of applications including medical and security applications.

The arrangement of transmitter (herein also called "illumination unit" or "transmit unit") and receiver (herein also called "receive unit") in an active imaging system may take on many different forms. In an embodiment relevant for the present invention multiple transmitters and receivers work together to form perform beam forming, e.g. in a MIMO radar or a MIMO active imaging system. There are predominately two different types of MIMO radars. The first type is called statistical MIMO, in which the antennas (generally the "transmit antennas" and the "receive antennas") are placed far apart from each other to provide different views of the object (generally the "scene"). The second type of MIMO is called beam forming (or co-located) MIMO in which the antennas are placed close to each other and form a sparse array. They act together to form a "virtual" beam forming array or "virtual phase centers". MIMO beam forming can be used in one dimension (1D MIMO) or in two dimensions (2D MIMO). The present invention can be used for both of these cases.

For MIMO beam forming, the combination of the transmitting and receiving antennas form a set of virtual phase centers which are located in space. Each phase center is obtained by convolution of the phase centers of the transmit and receive antennas. For an optimum radiation pattern for the final resulting beam, the virtual phase centers need to be separated with an equidistant linear spacing (ideally with spacings smaller than the wavelength/2). To achieve this in practice is very challenging, since the transmitter antennas need to be placed very close to the receiver antennas to maintain the linear spacing of the virtual phase centers.

J. H. G. Ender, J. Klare, "System Architectures and Algorithms for Radar Imaging by MIMO-SAR", IEEE Radar Conference 2009 describes a 1D MIMO beam forming arrangement in which the transmitter antenna blocks (Tx blocks) are optimally placed on the outside and the receiver antennas (Rx antennas) are placed in the middle of the antenna arrangement. Such an arrangement is regarded as optimum since the total physical size of the antenna is only slightly larger than the resulting aperture size set by the location of virtual phase centers. In this paper the basic spacing rules are described to achieve a linear spacing of the virtual phase centers. A similar arrangement is disclosed in J. Klare, O Saalmann, H. Wilden, "First Experimental Results with the imaging MIMO Radar MIRA-CLE X", EUSAR Conference 2010.

S. Ahmed et al, "Near Field mm-Wave Imaging with Multistatic Sparse 2D Arrays", Proceedings of the 6th European Radar Conference 2009, p. 180-183 describes three different 2D MIMO possibilities. In all cases the spacing of the closest Tx block to Rx block is maintained as (Tx to Tx antenna spacing)/2 in both dimensions.

X. Zhuge, "Short Range Ultra-Wideband Imaging with Multiple-Input Multiple Output", PhD Thesis, Delft University of Technology 2010 describes in chapter 4 many different 2D MIMO arrangements. On page 101 the authors conclude that the uniform 2D rectangular arrangement of the transmitter and receiver antennas (as seen on page 90, FIG. 4.3) has the largest effective aperture. This means that this 2D arrangement has the largest aperture size for a given physical size of antennas. This uniform 2D rectangular arrangement of the transmitter and receiver antennas is the same as proposed S. Ahmed (see above). As already stated for the virtual phase centers to be linearly spaced for such an arrangement the Tx block to Rx block spacing has to have a spacing corresponding to (Tx to Tx antenna spacing)/2.

V. Krozer et al, "Terahertz Imaging Systems with Aperture Synthesis Techniques", IEEE Transactions on Microwave Theory and Techniques, Vol. 58, No. 7, July 2010, pp. 2027-2039 describes a variety of different systems. Section IV.C (page 2033) describes in particular a 2D MIMO array in FIG. 7 in which the Rx antennas are placed close together in the middle and the Tx antenna are widely spaced on the outside. This is one way to implement a 2D MIMO array with the required Tx to Rx block spacing. However such a solution has a number of drawbacks which include that the aperture is of low efficiency (array is physically large with a correspondingly small virtual aperture size), that the receivers are placed close together causing coupling problems and that certain beam angles use a reduced number of receiver causing reduction in resolution.

However, none of these documents provides a solution how this required Tx block to Rx block spacing can be achieved in practice.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present invention.

SUMMARY

It is an object of the present invention to provide an antenna arrangement and a beam forming device providing a high efficiency aperture and optimal performance.

According to an aspect of the present invention there is provided an antenna arrangement comprising:

a first antenna array comprising a systematic arrangement of first antennas, at least two second antenna arrays, arranged adjacent to said first antenna array and each comprising a systematic arrangement of second antennas, at least two third antenna arrays each comprising at least one third antenna, wherein a third antenna array is arranged at a border area of said first antenna array and a second antenna array and replaces a first antenna closest to the adjacent second antenna array and a second antenna closest to the adjacent first antenna array, wherein said first or second antennas are transmitting and the other of said first or second antennas are receiving radiation and wherein the at least one third antenna is transmitting and/or receiving radiation.

According to a further aspect of the present invention there is provided a beam forming device for imaging a scene comprising an antenna arrangement, a feeding unit for feeding the antennas of said antenna arrangement and a processing unit for processing the beam formed output signals of said antenna arrangement.

The present invention is based on the idea to replace a first antenna of a first antenna array (e.g. an Rx antenna array) closest to a second antenna array (e.g. a Tx antenna array) and a second antenna of said second antenna array closest to said first antenna array, i.e. the two neighboring antennas of the two antenna arrays, by a third antenna array. With certain embodiments the present invention allows a high efficiency aperture of the antenna arrangement, preferably having an aperture size that is only slightly less than the physical size of the complete antenna. The transmitting and receiving antennas can be placed sufficiently close to each other to enable uniform or close to uniform spacing of the resulting virtual phase centers and hence optimal performance.

By replacing the outer first antenna and the inner second antenna with a third antenna, preferably a higher number of smaller third antenna elements of the third antenna array, the resulting phase center of the third antenna array can be moved to multiple positions within the aperture of the third antenna array depending on how the third antenna array is fed. In this way, the different phase centers of the synthesized TX and RX antennas can be placed separately at their ideal positions to yield the best performance for the complete beam forming device including a proposed antenna arrangement.

The proposed antenna arrangement may comprise one-dimensional or a two-dimensional antenna arrays. Further, the antenna arrays may be provided for either transmitting or receiving of radiation. At least one of the third antennas is shared between transmitting and receiving and, preferably, is coupled to some antenna control means, e.g. a circulator or any other antenna sharing device (e.g. a hybrid coupler, duplex filter, . . . ) that separates the transmission and the receiving signals.

According to the present invention several different approaches and embodiments are proposed for arranging the transmitter and receiving antennas so that the resulting virtual phase centers can be linearly spaced (or almost uniformly spaced) and thereby yielding optimum beam forming performance. The approach can be used for an ideally populated MIMO arrangement, in which the resulting phase centers are optimally spaced according to the Nyquist criterion (at or close to wavelength/2) or in a more "sparse" arrangement in which the phase center to phase center spacing is much greater and the number of transmitting and receiving antennas are reduced accordingly. In a more sparse arrangement antenna elements exhibiting a more narrow beam pattern should be used in order to suppress grating lobes.

It is to be understood that both the foregoing general description of the invention and the following detailed description are exemplary, but are not restrictive of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
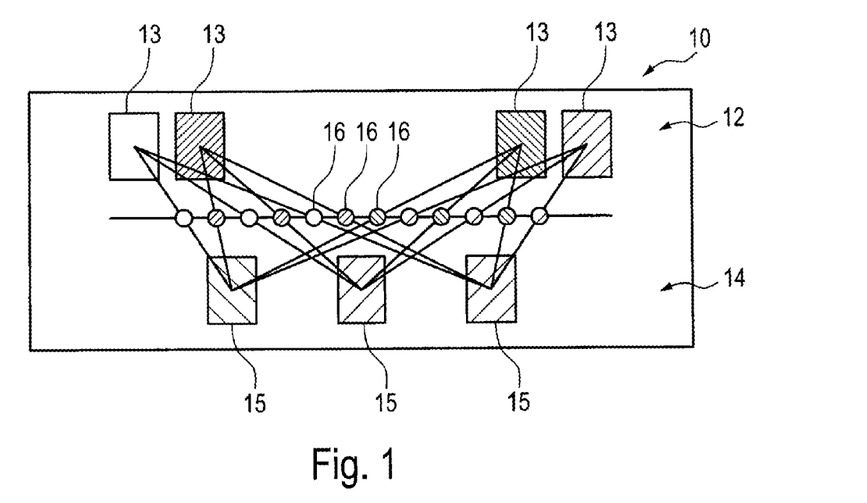
FIG. 1 shows an embodiment of a known 1D MIMO antenna arrangement.

FIG. 1 shows an embodiment of a known 1D MIMO antenna arrangement 10 comprising a Tx antenna array 12 of several transmit antennas 13 and an Rx antenna array 14 of several receive antennas 15. In order to obtain an equidistant virtual aperture distribution of the (virtual) phase centers 16 of the virtual antenna elements synthesized by a 2-way pattern, the Tx and Rx antenna elements 13, 15 of the MIMO antenna arrangement 10 must be at the correct position. The 2-way radiation pattern results from the multiplication of the Tx and the Rx patterns, whereas the virtual phase centers 16 are obtained by a convolution of the Tx and Rx phase centers. In FIG. 1 this is only qualitatively illustrated.

Figure 2A:
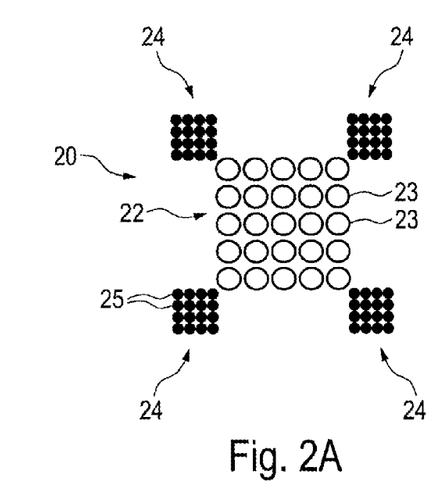
FIG. 2A shows an embodiment of a known 2D MIMO antenna arrangement.
Figure 2B:
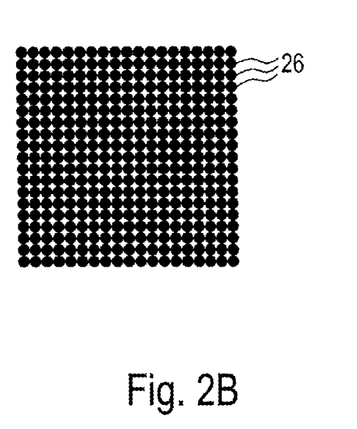
FIG. 2B shows the location of virtual phase centers.

FIG. 2A shows an embodiment of a known 2D MIMO antenna arrangement 20 comprising a first antenna array 22 comprising a systematic arrangement of first antennas 23 and four second antenna arrays 24, arranged adjacent to said first antenna array 22, in particular at the corners of said first antenna array 22, each of said four second antenna arrays 24 comprising a systematic arrangement of second antennas 25. In most embodiment the first antennas 22 are the receive antennas and the second antennas 25 are the transmit antennas; however, the functions of the antennas may also be exchanged. FIG. 2B shows the location of virtual phase centers 26 in principle.

Both of these examples shown in FIGS. 1 and 2A, preferably with closely spaced Tx antenna arrays on the outside and widely spaced Rx antennas inside, represent arrangements which have high space efficiencies. This means that the final physical size spanned by the antennas is only slightly larger than the resulting aperture size spanned by virtual phase centers. The aperture size spanned by these virtual phase centers sets the 'sharpness' or the resolution of the final beam. A bigger aperture size results in a sharper antenna beam pattern and thus a higher resolution of the resulting image.

In the following explanation of the present invention arrangements as shown in FIG. 2A will be used as examples due to the desirable high space efficiency, but the present invention can also be used for other, even less efficient implementations which will also be explained thereafter. Further, in the following explanations it is assumed that the first antennas 23 are receive (Rx) antennas and that the second antennas 25 are transmit (Tx) antennas, i.e. if Rx antennas are mentioned in the following, reference is generally made to the first antennas and if Tx antennas are mentioned in the following reference is generally made to the second antennas. However, the following explanations are equally or equivalently valid for other implementations where the first antennas 23 are transmit antennas and that the second antennas 25 are receive antennas.

To ensure that resulting phase centers are placed in a uniform way in these arrangements, certain spacing rules are preferably to be obeyed. Firstly, the Tx antennas shall be uniformly spaced, and an even number of Tx antennas shall be provided. This spacing is defined as Tx to Tx spacing. Secondly, the Rx spacing for an even or odd number of Rx antennas shall be $$Rx \text{ spacing} = \frac{N_{Tx}}{2}(Tx \text{ to } Tx \text{ spacing}) \quad (1)$$

where $N_{Tx}$ is the total number of transmit antennas in each x or y direction of the antenna arrangement. For the case shown in FIG. 2A, $N_{Tx}$=8, and for the case shown in FIG. 1, $N_{Tx}$=4. Finally, to ensure that the phase centers are uniformly distributed the spacing between the array of Tx antennas and the array of Rx antennas is preferably chosen as $$Tx \text{ block spacing to } Rx \text{ block spacing} = \frac{(Tx \text{ to } Tx \text{ spacing})}{2}. \quad (2)$$

Figure 3:
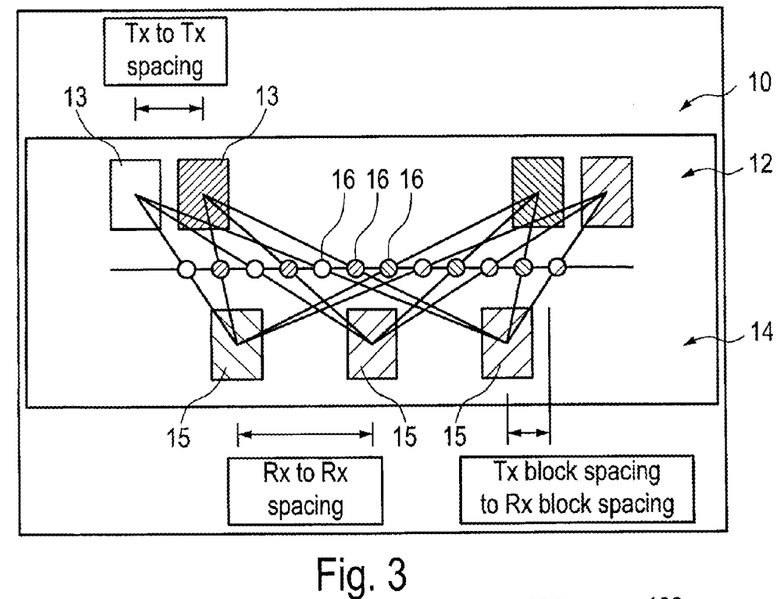
FIG. 3 shows the embodiment of the known 1D MIMO antenna arrangement with spacings marked.

For the sake of clarity, FIG. 3 shows the example of the 1D MIMO antenna arrangement 10 depicted in FIG. 1 again with these spacings clearly marked.

The spacing rule described in equation (2) is in practice the most challenging due to the physical size of the elements. Solving this problem is one of the objects of the present invention.

For the 1D MIMO antenna arrangement 10 shown in FIGS. 1 and 3, this spacing rule is maintained by moving the Tx antennas above the Rx antennas. However in some 1D MIMO situations, this solution may not be possible. For the 2D arrangement such a solution is impossible since there is generally no space in the second dimension. For the 2D MIMO antenna arrangement 20 shown in FIG. 2A the diameter of the Rx and Tx antennas (i.e. the black and white circles) represents example physical aperture sizes of the antenna elements. It should be noted, however, that these are just examples of shapes of the antenna; the antennas may not be physically round, but may have any physical shape, form or size. As can be seen in this example shown in FIG. 2A, it is impossible to maintain this spacing rule defined in equation (2) if the antenna elements have any reasonable size.

In order to meet this spacing rule and to obtain uniformly spaced phased centers, several different approaches and embodiments of the present invention are explained in the following. These embodiments are shown for an example of a 2D MIMO antenna arrangement similar to the 2D MIMO antenna arrangement 20 shown in FIG. 2A, but these embodiments can also be used for other 2D MIMO antenna arrangements and 1D MIMO antenna arrangements.

Figure 4:
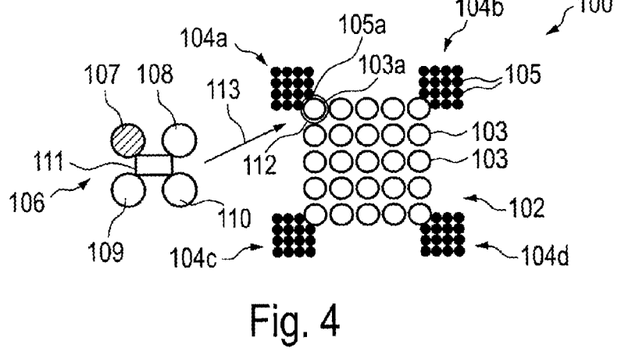
FIG. 4 shows a first embodiment of a 2D antenna arrangement according to the present invention.

FIG. 4 shows a first embodiment of a 2D antenna arrangement 100 according to the present invention. The general arrangement of the antenna arrays is almost identical to the arrangement of the antenna arrangement 20 shown in FIG. 2A. The antenna arrangement 100 comprises a first antenna array 102 comprising a systematic arrangement (in this example along rows and columns of a rectangular grid) of first antennas 103, four (generally at least two) second antenna arrays 104a, 104b, 104c, 104d arranged adjacent to said first antenna array 102 and each comprising a systematic arrangement (in this example along rows and columns of a rectangular grid) of second antennas 105. As mentioned above the first antennas 103 are preferably receive antennas and the second antennas 105 are preferably transmit antennas. However, inverted embodiments are also possible.

Different from the embodiment shown in FIG. 2A, the antenna arrangement 100 comprises four (generally at least two; FIG. 4 only shows one) third antenna arrays 106 each comprising five (generally at least one) third antennas 107, 108, 109, 110, 111. Each third antenna array 106 is arranged at a border area 112 of said first antenna array 102 and a second antenna array 104, i.e. since there are four second antenna arrays 104 and four border areas 112 (only one border area 112 is indicated in FIG. 4), there are four third antenna arrays 106. Each third antenna array 106 replaces a first antenna 103a closest to the adjacent second antenna array 104a and a second antenna 105a closest to the adjacent first antenna array 102. In other words, the adjacent antennas 103a and 105a are removed and replaced by a third antenna array 106 as indicated by the arrow 113.

Preferably, the at least one third antenna is transmitting and/or receiving radiation. In the embodiment shown in FIG. 4 the third antenna array 106 comprises one transmit/receive antenna 107, three receive antennas 108-110 and one center antenna 111 in the center of the other four antennas 107-110 having a square orientation. Said center antenna 111 mainly serves to avoid grating lobes (aliasing) in the pattern of the third antenna array 106.

The center element 111 is typically much smaller than the outer antenna elements 107-110, and as an example it can be a rectangular open-ended waveguide (as shown in FIG. 4) or a circular open-ended waveguide. Its phase center preferably coincides with the optimal phase center of the large receive antenna 103a, which is replaced. The (shaded) transmit/receive antenna 107 is located at the position of the inner transmit antenna 105a that is replaced. The (non-shaded) receive antennas 108-110 of the third antenna array 106 preferably exhibits a spacing, which extends the aperture of the third antenna array 106 to approximately the same area as the aperture of the receive antenna 103a.

Figure 5:
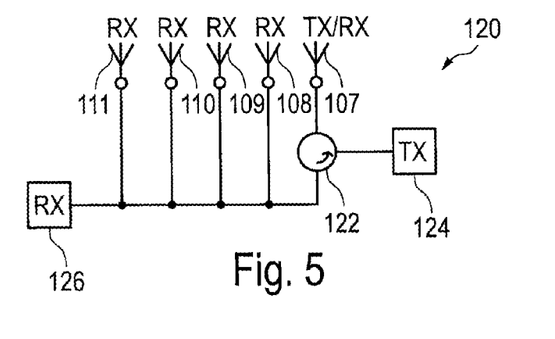
FIG. 5 shows an embodiment of a feeding network for the third antenna array used in the antenna arrangement shown in FIG. 4, FIGS. 6A, 6B show diagrams of the beam pattern of a third antenna array and a standard Rx antenna.

An embodiment of a feeding network 120 for a third antenna array 106 in order to combine the antennas 107-111 of the third antenna array 106 appropriately is shown in FIG. 5. This can be done by a 5:1 power combiner or by signal processing using digital beam forming. In either case one antenna 107 is shared between Tx and Rx. In the feed network the Tx and Rx signals can be separated by a circulator 122 or an equivalent circuit for antenna sharing, said circuit being coupled to both the transmit signal channel 124 and the receive signal channel 126.

The resulting patterns of the third antenna array 106 are the Tx pattern, which is the same as all the other patterns of the Tx antennas, and the synthesized Rx pattern, which is similar to the patterns of the single Rx antennas.

Figure 6A:
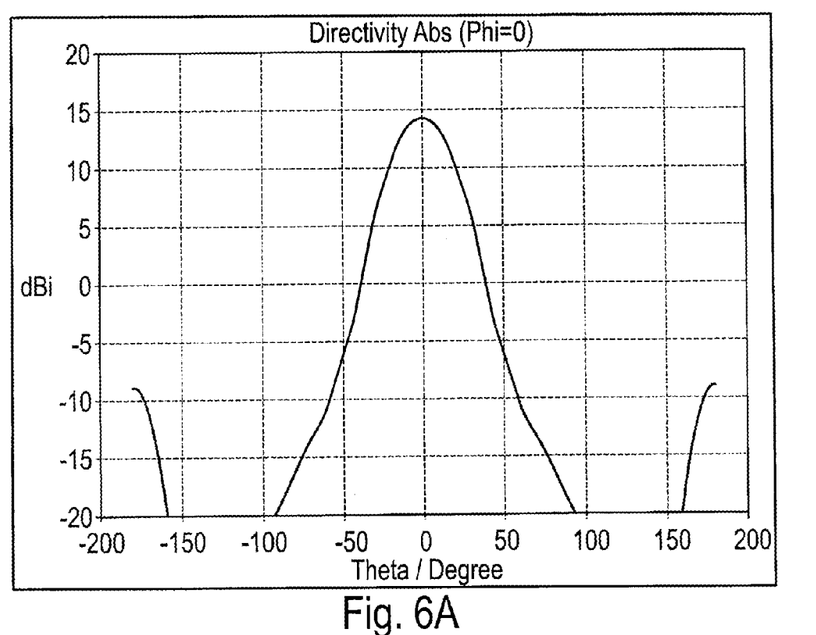
Figure 6B:
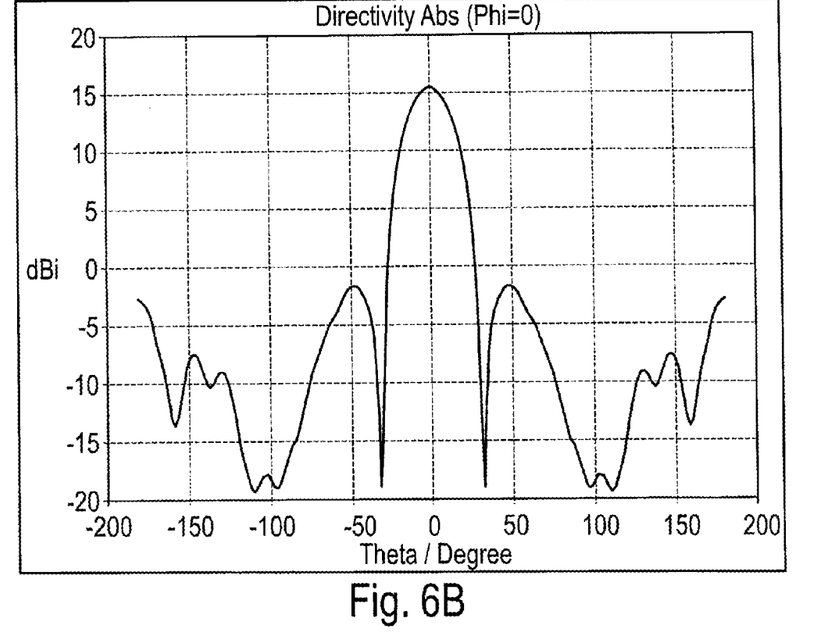

FIGS. 6A and 6B show diagrams of the beam pattern of a third antenna array 106 (FIG. 6B) and a standard Rx antenna 103 (FIG. 6A). The half-power beam width (HPBW) of the synthesized Rx antenna (i.e. of the third antenna array 106) is 26° (see FIG. 6B) instead of 34° which is the pattern of the outer Rx antennas 103 in the first antenna array 102 (see FIG. 6A). As the antenna arrays are generally relatively large in terms of the number of antenna elements, this does not have any significant effect on the HPBW of the resulting beam.

In a practical embodiment the third antenna array 106 shown in FIG. 4 can be implement by four corrugated conical horns used as outer antennas 107-110 and an open-ended rectangular waveguide 111 placed in the middle.

Figure 7:
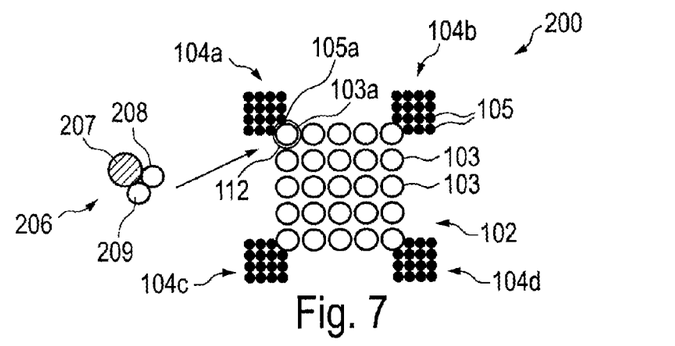
FIG. 7 shows a second embodiment of a 2D antenna arrangement according to the present invention.

FIG. 7 shows a second embodiment of a 2D antenna arrangement 200 according to the present invention. Basically it comprises the same first and second antenna arrays 102, 104 as the first embodiment of the 2D antenna arrangement 100 shown in FIG. 4. Hence, the same elements are provided with the same reference signs. The third antenna array 206 used in this embodiment comprises one transmit antenna 207 and two receive antennas 208, 209. The transmit antenna 207 is positioned at the desired place of the inner transmit antenna 105a of the second antenna array 104a. The center of the two receive antennas 208, 209 coincides with the optimum position of the phase center of the outer receive antenna 103a.

Figure 8:
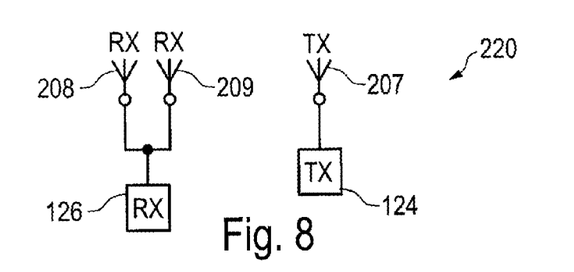
FIG. 8 shows an embodiment of a feeding network for the third antenna array used in the antenna arrangement shown in FIG. 7.

An embodiment of a feeding network 220 for a third antenna array 206 is shown in FIG. 8. In this embodiment no isolator is needed. The transmit antenna 207 is coupled to a transmit channel 124 separate from the two receive antennas 208, 209 that are coupled to a receive channel 126.

Due to the asymmetric aperture formed by the two receive antennas 208, 209, the resulting pattern has an elliptical shape. But as already mentioned, this has no severe impact on the array pattern, which results from many antenna elements. Though the pattern is not symmetric, the more important requirement is fulfilled, namely the phase center is located at the optimum position.

Figure 9:
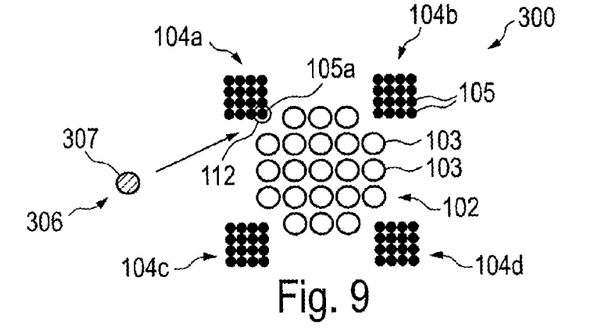
FIG. 9 shows a third embodiment of a 2D antenna arrangement according to the present invention.

FIG. 9 shows a third embodiment of a 2D antenna arrangement 300 according to the present invention. Compared to the first and second embodiments shown in FIGS. 4 and 7, this embodiment yields an equivalent grid of the virtual aperture distribution, which is not exactly uniform, but is close to being uniform. In this embodiment the third antenna array 306 comprises only a single transmit/receive antenna 307 which is shared between transmission and reception (i.e. to simultaneously transmit and receive radiation), e.g. by using a circulator 322 or an equivalent circuit as shown in the third embodiment of the feeding network 320 depicted in FIG. 10.

Preferably, said single third antenna 307 is identical to the second antennas 105 of the adjacent second antenna array 104a. In alternative embodiments said single third antenna 307 is identical to the first antenna of the adjacent first antenna array 102. Advantageously, said single third antenna 307 is arranged at a position at which the replaced second antenna 105a of said second antenna array would have been placed (to resemble the systematic arrangement of the second antennas 105 of the second antenna array 104a, if said second antenna 105a were not replaced). In an alternative embodiment said single third antenna 307 is arranged at a position or close to a position at which the replaced first antenna (not shown in FIG. 9) of said first antenna array 102 would have been placed.

In other words, in the embodiment shown in FIG. 9 the outer antenna (103a in FIGS. 4 and 7) of the first antenna array 102 is removed. The second antenna array 104a is moved to a position such that the position of the inner second antenna 105a of the second antenna array 104a coincides with the position of the removed outer first antenna (103a) of the first antenna array 102.

The pattern of the shared receive antenna 307 is different than the patterns of the other receive antennas 103. However, this is of less importance for the overall MIMO pattern. The virtual phase centers are almost equidistant though. This has a higher impact on the resulting MIMO pattern.

In the above three embodiments of the present invention using this high efficiency aperture MIMO approach, which is the optimum for rectangular Tx and Rx antenna arrays, have been described. In these embodiments the closely spaced antenna arrays of Tx antennas are on the outside and the widely spaced Rx antennas are on the inside. Due to reciprocity Tx and Rx functionality can be swapped. However, the general ideas of these embodiments can also be applied to an alternative MIMO arrangement which has lower space efficiency.

Figure 10:
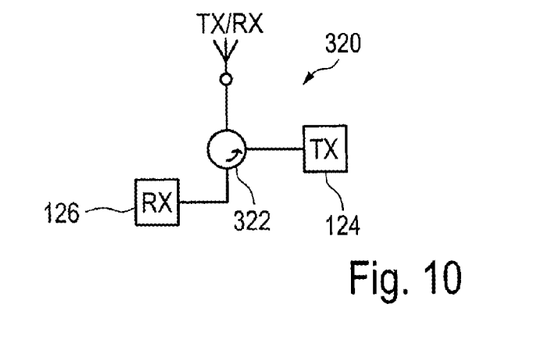
FIG. 10 shows an embodiment of a feeding network for the third antenna array used in the antenna arrangement shown in FIG. 9.
Figure 11:
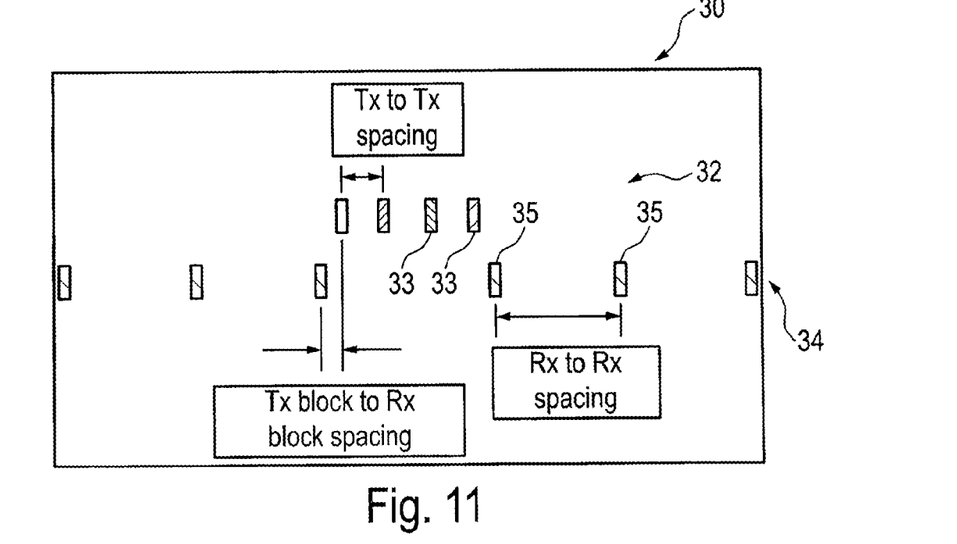
FIG. 11 shows another embodiment of a known 1D MIMO arrangement with spacings marked.

An example of such a known 1D MIMO arrangement 30 is shown in FIG. 11, where now the closely spaced Tx antennas 33 of the Tx antenna array are in the middle and the widely spaced Rx antennas 35 of the Rx antenna array 34 are on the outside. For such an arrangement, slightly different spacing rules apply than for the previous presented high efficiency arrangements. If it is assumed that the transmit antennas 33 are the ones closely spaced in the middle with a spacing of Tx to Tx spacing, the Rx spacing is defined for both even or odd number of Tx antennas as, $$Rx \text{ spacing} = N_{Tx} \times (Tx \text{ to } Tx \text{ spacing}) \quad (3)$$

where $N_{Tx}$ is the total number of transmit antennas in each x or y direction. For the case shown in FIG. 10, $N_{Tx}=4$.

The spacing (in the x and y direction) between the Tx antenna array 32 and the surrounding Rx antennas 35 needs to be maintained in accordance with $$Tx \text{ block spacing to } Rx \text{ block spacing} = \frac{(Tx \text{ to } Tx \text{ spacing})}{2} \quad (4)$$

for the phase centers to be linearly uniformly spaced. In the same way as the high efficiency aperture approach this last rule (equation 4) is the most difficult to implement in practice.

Figure 12A:
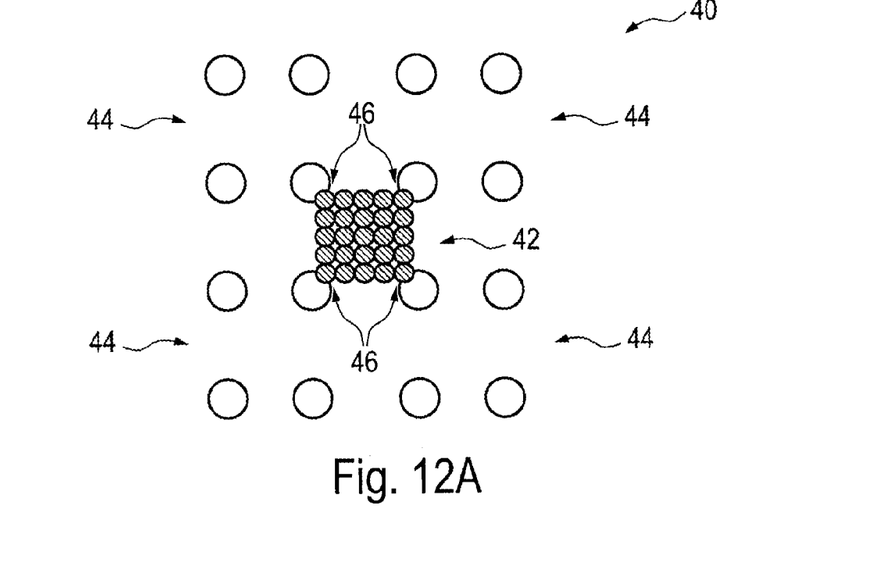
FIGS. 12A-12E show several embodiments of a 2D antenna arrangement according to the present invention with inverted Tx and Rx antennas compared to the first to third embodiments.

Further embodiment of a antenna arrangement according to the present invention are shown in FIGS. 12A-12E, 13A-13D, and 14A-14E. The black circles are example Tx antennas and the white circles are example Rx antennas. The dashed circles indicate shared antennas. It is important to note that the diameter of black and white circles, represent example physical aperture sizes of the elements. These are just examples shapes of the antenna elements and the antennas elements may not necessarily be physically round and may have any physical shape, form or size FIGS. 12A-12E show several embodiments of a 2D antenna arrangement according to the present invention with inverted Tx and Rx antennas compared to the first to third embodiments. In particular, FIG. 12A shows the initial configuration 40 (which is not an embodiment of the present invention) with overlapping antennas at the border areas 46 of the central Tx antenna array 42 and the outer Rx antenna arrays 44.

Figure 12B:
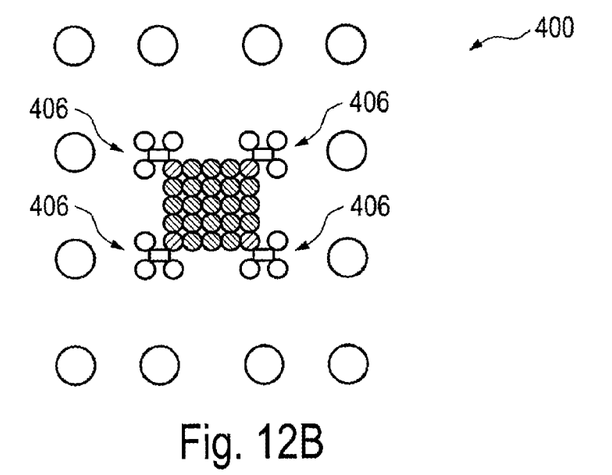
Figure 12C:
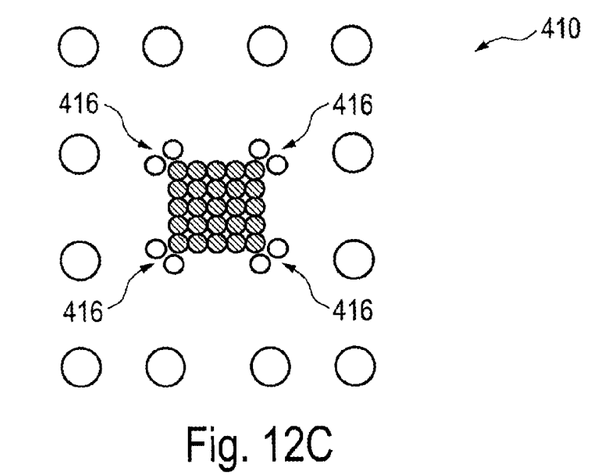
Figure 12D:
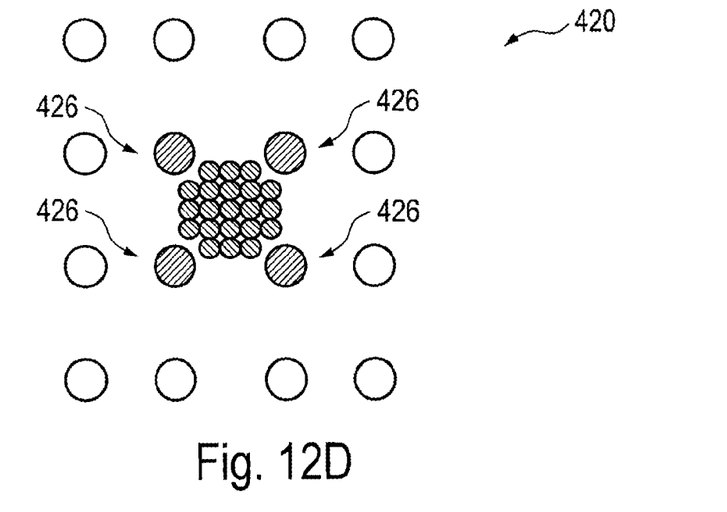
Figure 12E:
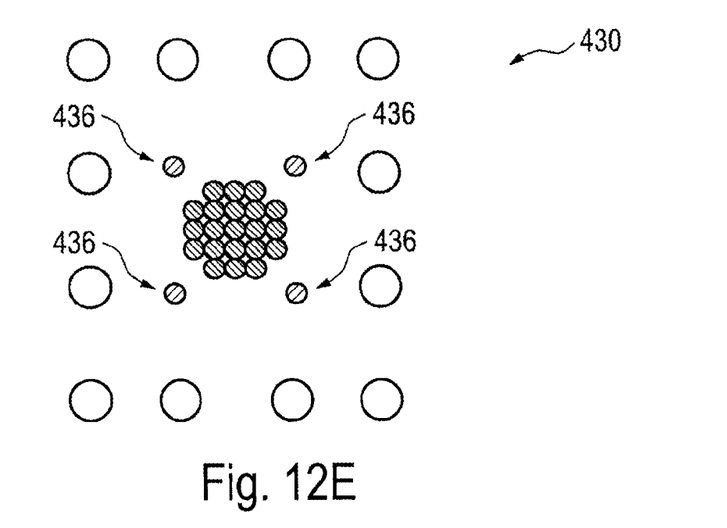

FIG. 12B shows a first inverted embodiment of a 2D antenna arrangement 400 comprising a third antenna array 406 like in the first embodiment shown in FIG. 4 comprising five third antennas (and a circulator or similar element as shown in FIG. 5). FIG. 12C shows a second inverted embodiment of a 2D antenna arrangement 410 comprising a third antenna array 416 like in the second embodiment shown in FIG. 7 comprising three third antennas. FIG. 12D shows a third inverted embodiment of a 2D antenna arrangement 420 comprising a third antenna array 426 like in the third embodiment shown in FIG. 9 comprising one (large) third antenna (and a circulator or similar element as shown in FIG. 10). FIG. 12E shows a fourth inverted embodiment of a 2D antenna arrangement 430 comprising a third antenna array 436 like in the third embodiment shown in FIG. 9 comprising one (small) third antenna (and a circulator or similar element as shown in FIG. 10).

Figure 13A:
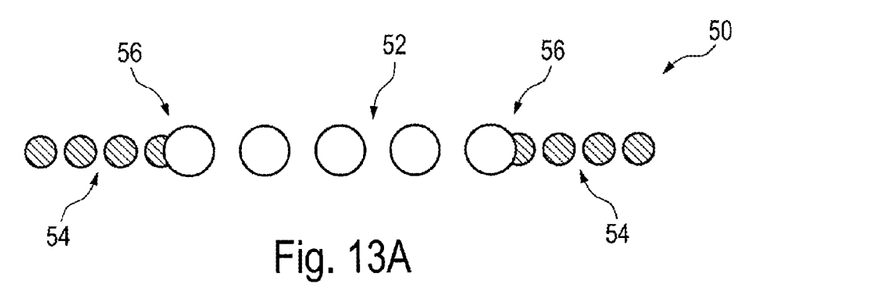
FIGS. 13A-13D show several embodiments of a 1D antenna arrangement according to the present invention.
Figure 13B:
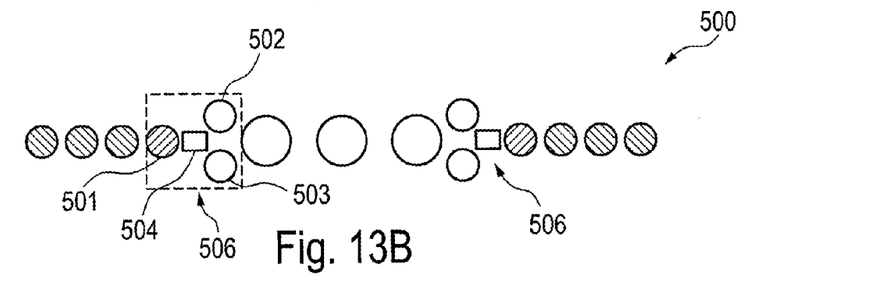

FIGS. 13A-13D show several embodiments of a 1D antenna arrangement according to the present invention. In particular, FIG. 13A shows the initial configuration 50 (which is not an embodiment of the present invention) with overlapping antennas at the border areas 56 of the central Tx antenna array 52 and the outer Rx antenna arrays 54. FIG. 13B shows a first embodiment of a 1D antenna arrangement 500 comprising a third antenna array 506 like in the first embodiment shown in FIG. 4, however comprising only four third antennas (and a circulator or similar element as shown in FIG. 5). The three horn antennas 501, 502, 503 are part of a triangle with equal sides. The open-ended waveguide 504 is placed at the position of the former (replaced) large RX horn antenna. Depending on the length of the sides of the triangle the inner open-ended waveguide 504 is optional. The shaded antenna 501 is used for TX and RX at the same time by employing a circulator or any antenna sharing device.

Figure 13C:
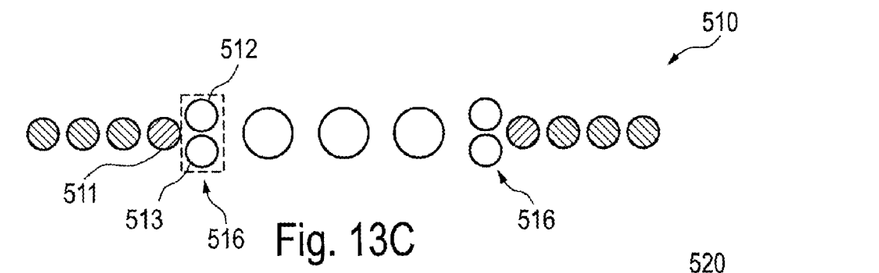

FIG. 13C shows a second embodiment of a 1D antenna arrangement 510 comprising a third antenna array 516 like in the second embodiment shown in FIG. 7, however comprising only two third antennas. The TX antenna 511 is only used for transmission. The RX horn antennas 512, 513 are only used for reception.

Figure 13D:
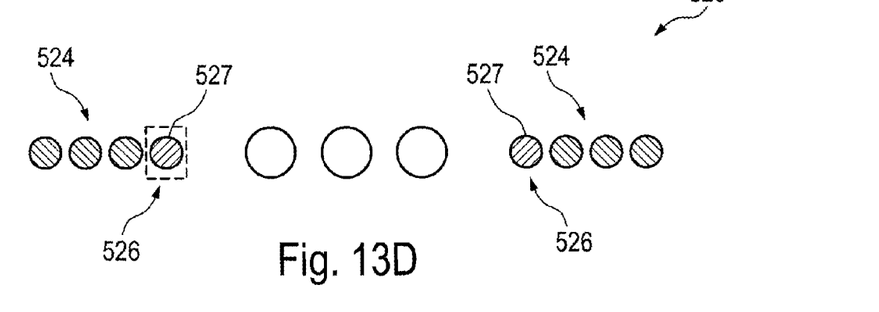

FIG. 13D shows a third embodiment of a 1D antenna arrangement 520 comprising a third antenna array 526 like in the third embodiment shown in FIG. 9 comprising one (large) third antenna (and a circulator or similar element as shown in FIG. 10). The outer RX antenna is removed, the TX antenna arrays 524 are moved in to the position of the former RX antenna and the third antenna 527 is simultaneously shared as TX and RX antenna.

Figure 14A:
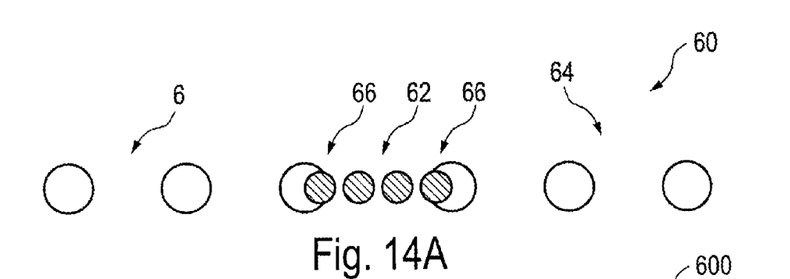
FIGS. 14A-14E show several embodiments of a 1D antenna arrangement according to the present invention with inverted Tx and Rx antennas compared to the embodiments shown in FIG. 13.
Figure 14B:
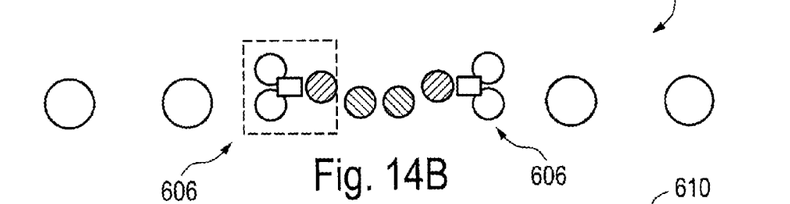
Figure 14C:
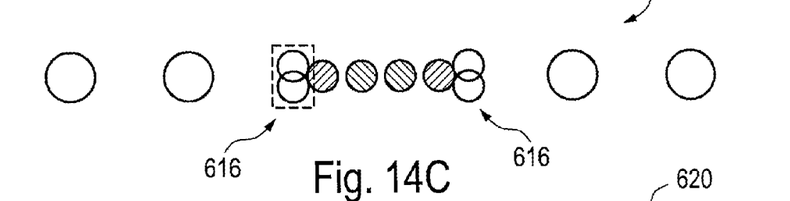

FIGS. 14A-14E show several embodiments of a 1D antenna arrangement according to the present invention with inverted Tx and Rx antennas compared to the embodiments shown in FIGS. 13A-13D. In particular, FIG. 14A shows the initial configuration 60 (which is not an embodiment of the present invention) with overlapping antennas at the border areas 66 of the central Tx antenna array 62 and the outer Rx antenna arrays 64. FIG. 13B shows a first inverted embodiment of a 1D antenna arrangement 600 comprising a third antenna array 606 like in the first embodiment shown in FIG. 13B comprising four third antennas (and a circulator or similar element as shown in FIG. 5). FIG. 14C shows a second inverted embodiment of a 1D antenna arrangement 610 comprising a third antenna array 616 like in the second embodiment shown in FIG. 13C comprising two third antennas.

Figure 14D:
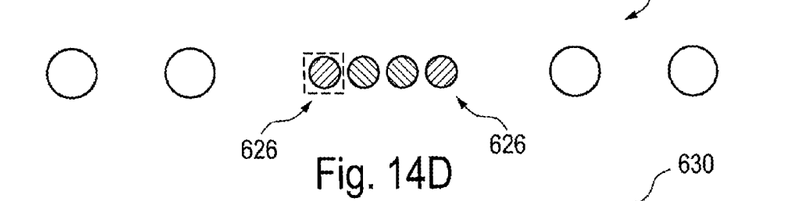
Figure 14E:
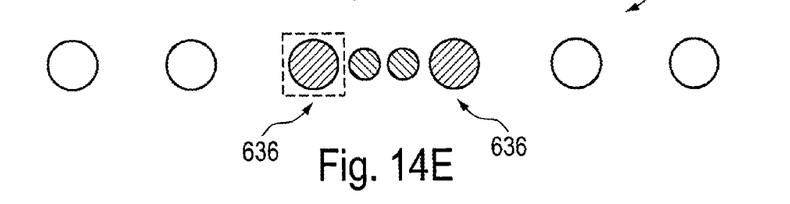

FIG. 14D shows a third inverted embodiment of a 1D antenna arrangement 620 comprising a third antenna array 626 like in the third embodiment shown in FIG. 13D comprising one (small) third antenna (and a circulator or similar element as shown in FIG. 10). FIG. 14E shows a fourth inverted embodiment of a 1D antenna arrangement 630 comprising a third antenna array 636 like in the third embodiment shown in FIG. 9 comprising one (large) third antenna (and a circulator or similar element as shown in FIG. 10).

For this low space efficiency approach (in 1D or 2D) all of the proposed embodiments can be used to meet the spacing rules above to obtain uniformly linearly spaced (or close to) phase centers.

Example application areas, in which this invention may be used, are for any type of MIMO radar system. Any frequency can be used. Presently such systems today use frequencies from ultrasonic (where small speakers and microphones are used instead of antenna) to tens of Terahertz. In future other frequencies might be used.

Figure 15:
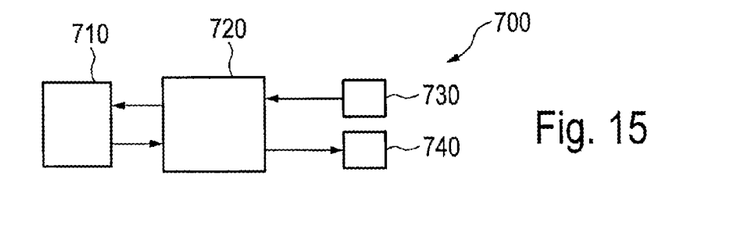
FIG. 15 shows a schematic diagram of a beam forming device according to the present invention.

A beam forming device 700, e.g. for obtaining image information of as scene 710, according to the present invention is schematically depicted in FIG. 15. It comprises a antenna arrangement 720 as proposed according to the present invention and as discussed above, a feeding unit 730 for feeding the antennas of said antenna arrangement 720 and a processing unit 740 for processing said beam formed output signals. The output signals of said processing unit 740 may then be used for various purposes, for instance to construct an image of the scene 710 in an image construction unit (not shown) as generally provided in an active imaging device.

Obviously, numerous modifications and variations of the present disclosure are possible in light of the above teachings. It is therefore to be understood that within the scope of the appended claims, the invention may be practiced otherwise than as specifically described herein.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

The invention claimed is:

1. An antenna arrangement comprising:
    a first antenna array comprising a systematic arrangement of first antennas,
    at least two second antenna arrays, arranged adjacent to said first antenna array and each comprising a systematic arrangement of second antennas,
    at least two third antenna arrays each comprising at least one third antenna, wherein a third antenna array is arranged at a border area of said first antenna array and a second antenna array and replaces a first antenna closest to the adjacent second antenna array and a second antenna closest to the adjacent first antenna array,
    wherein said first or second antennas are transmitting and the other of said first or second antennas are receiving radiation and wherein the at least one third antenna is transmitting and/or receiving radiation.

2. The antenna arrangement as claimed in claim 1,
    wherein said first antenna array comprises a row of first antennas and wherein two second antenna arrays each comprising a row of second antennas and two third antenna arrays each comprising at least two third antennas are provided.

3. The antenna arrangement as claimed in claim 1,
    wherein said first antenna array comprises a two-dimensional field of first antennas and wherein four second antenna arrays each comprising a two-dimensional field of second antennas and four third antenna arrays are provided.

4. The antenna arrangement as claimed in claim 1,
    wherein a third antenna array comprises a two-dimensional field of at least three third antennas.

5. The antenna arrangement as claimed in claim 4,
wherein said third antenna array comprises a two-dimensional field of four systematically arranged third antennas, said four third antennas being arranged at the corners of a rectangle or square or along a circular path.

6. The antenna arrangement as claimed in claim 5,
wherein a third antenna array further comprises a fifth third antenna arranged between said four third antennas.

7. The antenna arrangement as claimed in claim 6,
wherein said fifth third antenna comprises an open-ended waveguide, in particular having a rectangular or circular cross section.

8. The antenna arrangement as claimed in claim 6 or 7,
wherein said fifth third antenna is arranged at a position at which the replaced first antenna of said first antenna array would have been placed.

9. The antenna arrangement as claimed in claim 4,
wherein said third antenna array comprises a two-dimensional field of three third antennas, said three third antennas being arranged at the corners of a triangle or along a circular path.

10. The antenna arrangement as claimed in claim 9,
wherein two inner third antennas of a third antenna array arranged closest to the adjacent first antenna array are arranged such that the center between said two inner third antennas is arranged at a position at which the replaced first antenna of said first antenna array would have been placed.

11. The antenna arrangement as claimed in claim 9 or 10,
wherein said two inner third antennas comprise open-ended waveguides, in particular having a rectangular or circular cross section.

12. The antenna arrangement as claimed in claim 5,
wherein an outer third antenna of a third antenna array arranged closest to the adjacent second antenna array is arranged at a position at which the replaced second antenna of said second antenna array would have been placed.

13. The antenna arrangement as claimed in claim 12,
wherein said outer third antenna is identical to the second antennas of said adjacent second antenna array.

14. The antenna arrangement as claimed in claim 12 or 13,
wherein said outer third antenna is configured to simultaneously transmit and receive radiation, in particular by use of an antenna sharing element, and the other third antennas of the same third antenna array are performing the same action of transmitting or receiving radiation as the first antennas of the first antenna array.

15. The antenna arrangement as claimed in claim 5,
wherein the third antennas of a third antenna array except said outer third antenna have a smaller cross section than the replaced first antenna.

16. The antenna arrangement as claimed in claim 5,
wherein the third antennas of a third antenna array except said outer third antenna substantially cover the same area as the replaced first antenna.

17. The antenna arrangement as claimed in claim 3,
wherein a third antenna array comprises a single third antenna that is configured to simultaneously transmit and receive radiation, in particular by use of an antenna sharing element.

18. The antenna arrangement as claimed in claim 17,
wherein said single third antenna is identical to the second antennas of the adjacent second antenna array or the first antennas of the adjacent first antenna array.

19. The antenna arrangement as claimed in claim 17 or 18,
wherein said single third antenna is arranged at a position at which the replaced second antenna of said second antenna array would have been placed.

20. The antenna arrangement as claimed in claim 17,
wherein said single third antenna is arranged at a position or close to a position at which the replaced first antenna of said first antenna array would have been placed.

21. The antenna arrangement as claimed in claim 1,
wherein all first antennas are identical and/or wherein all second antennas are identical.

22. The antenna arrangement as claimed in claim 1,
wherein the antennas that are configured for transmitting radiation have an aperture area that is smaller than the an aperture area of the antennas that are configured for receiving radiation.

23. The antenna arrangement as claimed in claim 1,
wherein all first antennas are uniformly spaced and/or wherein all second antennas are uniformly spaced.

24. A beam forming device, comprising:
an antenna arrangement as claimed in claim 1,
a feeding unit for feeding the antennas of said antenna arrangement, and
a processing unit for processing said the beam formed output signals of said antenna arrangement.

* * * * *